United States Patent Office 3,746,533
Patented July 17, 1973

3,746,533
PROCESS OF PRODUCING FERRO-NICKEL IN A ROTARY FURNACE INCLUDING PELLETIZING AND PRE-REDUCING ORE
Lucas Sofoclis Moussoulos, 1 Rue Tsacalof, Athens, Greece
Continuation-in-part of abandoned application Ser. No. 24,073, Mar. 31, 1970. This application Mar. 22, 1972, Ser. No. 237,114
Int. Cl. C21b 1/08
U.S. Cl. 75—3                                    12 Claims

ABSTRACT OF THE DISCLOSURE

Ferro-nickel of high nickel content is produced from iron ore of low nickel content by mixing and grinding solid carbonaceous fuel with the ore, and nodulizing to form homogeneous pellets which are then heated to a temperature of 1000 to 1200° C. in a slightly oxidizing atmosphere to form an outer shell of $Fe_2O_3$ on each pellet. The proportion of carbonaceous fuel initially mixed with the ore is such that in the resulting heat-treated pellets the nickel is in the metallic state, not more than 6% of the iron is in the metallic state, 70 to 85% of the iron is present as FeO, and the remainder as $Fe_2O_3$ concentrated in the outer shells, and the carbon content is not more than 1%. The resulting pellets are charged into a rotary furnace and there heated to a temperature of 1450 to 1550° C. by the flame of at least one burner, and the resulting molten alloy and slag are then separated.

CROSS-REFERENCE TO RELATED APPLICATION

This is a continuation-in-part of application Ser. No. 24,073, filed Mar. 31, 1970, and now abandoned.

BACKGROUND OF THE INVENTION

The present invention relates to a novel process for the extraction of nickel and/or cobalt with high recoveries from any ore or material containing the oxides of these elements together with iron or iron oxides, directly in the form of commercial grade ferro-nickel. In referring to nickel hereinafter it is meant to include any cobalt present in the ore treated.

The process is particularly adaptable to treating nickel-iferous iron ores of the silicate type such as the usual laterites and garnierites found in New Caledonia, the Philippines, Indonesia, Cuba, Greece, Yugoslavia, Guatemala and Venzuela. These ores normally contain considerable free and combined water and analyze on a dry basis less than 3% nickel, less than 0.15% cobalt and more than 15% iron by weight.

In order to produce ferro-nickel of high nickel content from such ores of low nickel content, it is necessary to subject the ore to a partial reduction in which the iron content is largely converted into FeO, while the more easily reduced nickel is converted into the form of free nickel. The resulting partially reduced ore, consisting largely of FeO with a small proportion of free iron, and containing the nickel in the metallic form, is then smelted or fused to recover a ferro-nickel alloy of high nickel content.

In commercial practice heretofore, it has been found to be impossible to treat the partially reduced ore, consisting largely of FeO, in an ordinary rotary furnace, because a partially reduced ore consisting largely of FeO has a softening temperature as low as about 900° C., and attempts to fuse such an ore in a rotary furnace have met with serious difficulties caused by the formation of rings and coatings in the rotary furnace.

A rotary furnace can be used in a process in which the reduction of the iron content of the ore to metallic iron is completed at a temperature below 900° C. and thus below the softening temperature of a reduced product rich in FeO. However, the nickel content of an alloy produced by such a process is no higher than the ratio of nickel to iron in the original ore.

In every commercial process in which the iron content of an ore is only partially reduced, largely to FeO, before fusion, it has been found to be necessaary to carry out the fusion in an electric furnace rather than in a rotary furnace.

In all these electric smelting processes very large amounts of frequently expensive or hard to obtain electric energy are required and important investments are necessary.

SUMMARY OF THE INVENTION

It is an object of the present invention to provide a novel method by which a pure and commercial grade of ferro-nickel, free from oxidizable elements such as silicon, carbon, chromium and phosphorus, is obtained directly and with high recovery, without the use of an electric furnace.

In accordance with the process of the present invention, ferro-nickel of high nickel content is produced from iron ore of low nickel content by mixing and grinding solid carbonaceous fuel with the ore, and nodulizing to form homogeneous pellets. The pellets are heated to a temperature of 1000 to 1200° C. in a slightly oxidizing atmosphere to form an outer shell of $Fe_2O_3$ on each pellet, the proportion of carbonaceous fuel initially mixed with the ore being such that in the resulting heat-treated pellets the nickel is in the metallic state, not more than 6% of the iron is in the metalic state, 70 to 85% of the iron is present as FeO, and the remainder as $Fe_2O_3$ concentrated in the outer shells, and the carbon content is not more than 1%. The pellets are charged into a rotary furnace and there heated to a temperature of 1450 to 1550° C. by the flame of at least one burner, to produce a molten alloy and slag which can be separated.

Because of the continuous agitation of the bath, the strong heating from the flame of the burner and the oxidizing character of the slag, chemical equilibrium between the alloy and the slag is rapidly attained and the oxidizable elements are completely eliminated.

According to a preferred embodiment of the invention, the ore to be treated and the carbonaceous fuel are ground, mixed and agglomerated in the form of green pellets which are then submitted to the preliminary reduction. This reduction brings about a certain strengthening of the pellets, thereby facilitating their subsequent handling and decreasing the production of dust. Further, with such a clean and uniform feed the composition of the alloy produced is under better control and the thermal efficiency of the furnace is improved.

The smelting furnace employed is preferably a rotary furnace which is slightly inclined, and which is intensively cooled by spraying large quantities of water so that its shell remains constantly covered by a continuous film of water; the resulting strong cooling causes the furnace to be self-lining, thereby controlling efficiently the lining wear of the furnace.

The melts of the alloy and the slag flowing out at the exit end of the rotary furnace are collected, preferably in a settling tank provided with a heating arrangement enabling the adjustment of the temperature of the alloy to the desired level according to the tapping requirements.

DESCRIPTION OF THE PREFERRED EMBODIMENT

Figure 1:
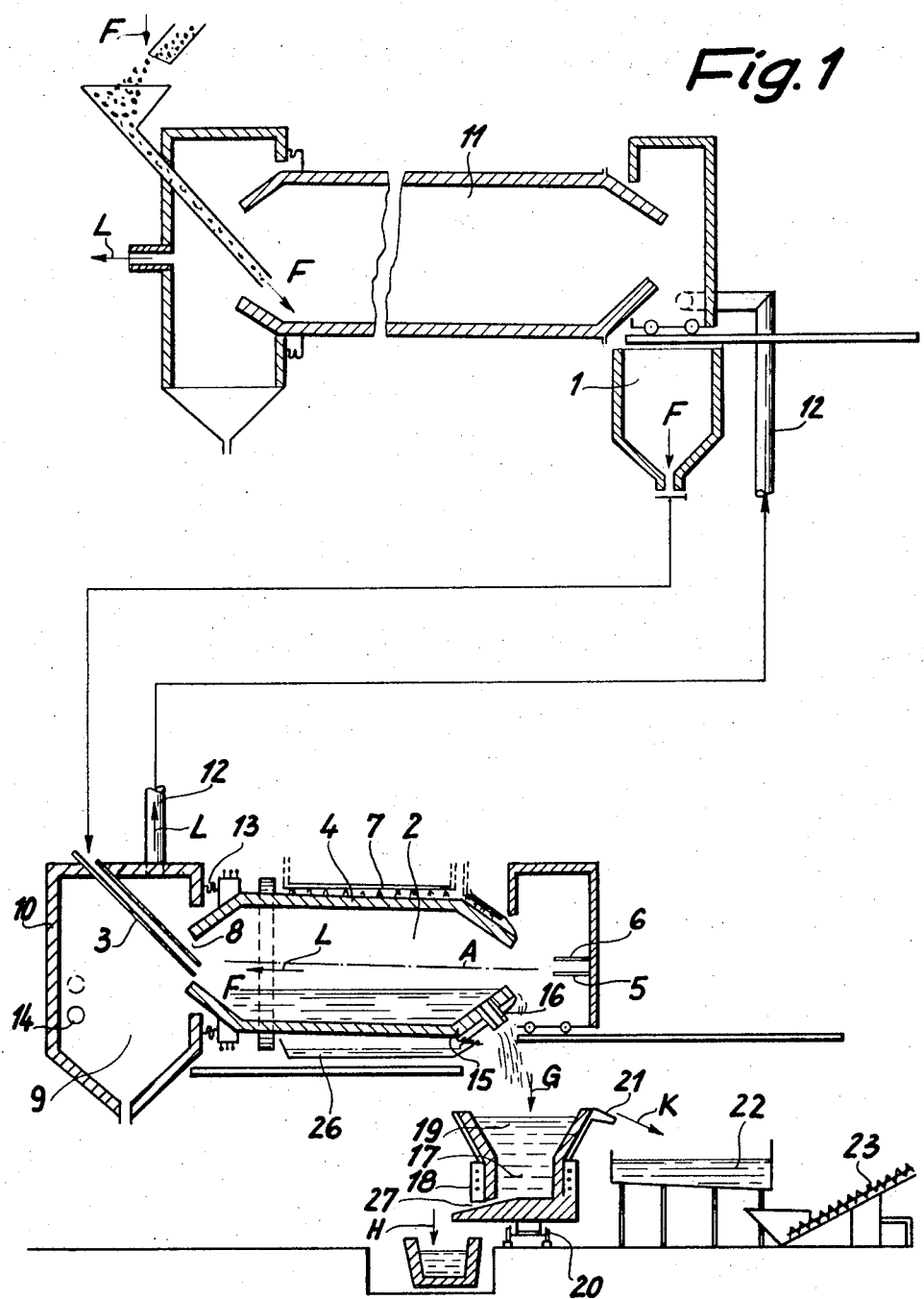
FIG. 1 is a schematic vertical section showing the general layout corresponding to a preferred embodiment of the invention.
Figure 2:
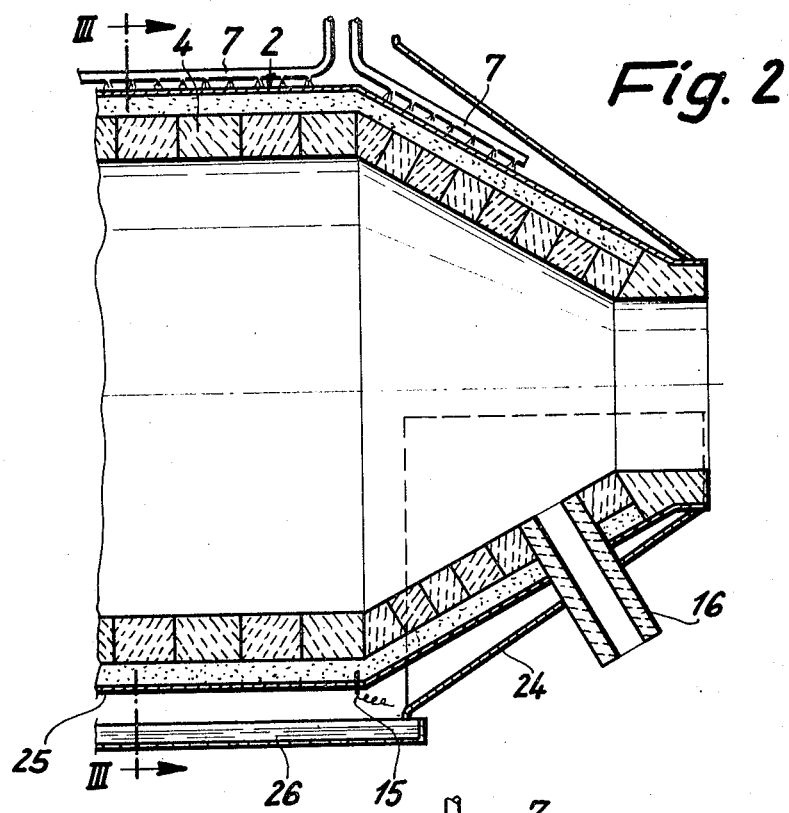
FIG. 2 is a vertical section on a larger scale of the exit end of the smelting furnace where the metal and slag melts are evacuated.
Figure 3:
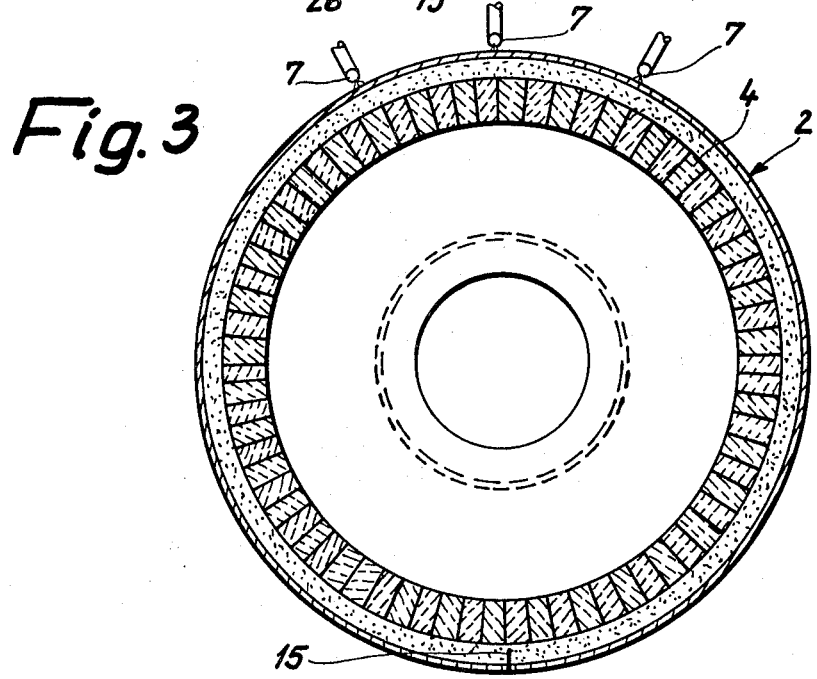
FIG. 3 is a section on the line III—III of FIG. 2.

The general layout shown in FIG. 1 comprises a preliminary reduction rotary kiln which is described in more detail in French Pat. No. 1,555,289 granted to the present applicant on Dec. 16, 1968. Under the exit end of the kiln is an insulated bin 1. A water cooled feeding chute 3 connects the bottom of this bin with the inlet 8 of a smelting furnace 2. The chute 3 crosses a dust chamber 9 with walls 10 protected by refractory bricks. Seal 13 provides a gas-tight joint between the rotary smelting furnace 2 and the dust chamber 9. From this chamber the hot gases reach the rotary kiln 11 through ducts 12. Along the inside walls of the dust chamber 9 run recuperators 14 for preheating the air used in the burners of the smelting furnace 2.

These heavy oil burners are two: one of short flame 5 and another of long flame 6; they are mounted close to the exit end of the smelting furnace 2; the combustion air is preheated in the recuperators 14 and may be oxygen enriched.

The long flame burner 6 is horizontally disposed and is operated with a relatively low air to fuel ratio in order to produce a long and somewhat reducing flame. The short flame burner 5 is inclined slightly downward and is operated with a relatively high air to fuel ratio, to produce a shorter oxidizing flame. This arrangement produces proper heating of the furnace. Also, the combination of the short flame and the long flame provides an oxidizing zone at the exit end of the rotary furnace and a neutral zone at the feed end of the furnace, because the excess of air from the short flame is consumed in the combustion of the excess of fuel in the long flame.

Accordingly, the pellets which are charged in through the inlet end of the rotary furnace are then heated to their fusion temperature in a neutral atmosphere, which prevents any change from occurring in the properties of the pellets during this heating operation.

The neutral atmosphere at the inlet end of the rotary furnace 2 also is quite suitable to be supplied to the rotary kiln 11 in which partial reduction of the ore in the pellets is being carried out.

The smelting furnace 2 turns around the inclined axis A—A at a speed between 2 and 5 revolutions per minute, the rotary drive not being shown. It is lined with magnesia bricks 4. Into these bricks and especially in the zone in contact with the liquid slag, are set the thermocouple-elements 15. A spray system 7 is provided for cooling the shell of the furnace 2 and collecting tank 26 is disposed along the lower line 25 of the furnace. The smelting furnace 2 is provided with a tapping hole 16, through the lining 4, close to the exit end; this hole can be eliminated or it can be duplicated by a second hole diametrically opposed.

Under the exit end 24 of the smelting furnace 2 is disposed the settling tank 17 in which takes place the separation of the alloy and the slag. This settling tank 17 comprises a cylindrical part 18 provided with an electric winding and operated as a coreless induction furnace; the cylindrical part 18 is surmounted by an upper conical part 19 cooled by circulating water.

A tapping hole 27 is provided at the bottom of the settling tank 17, which is mounted on a truck 20, enabling rapid substitution of a new settling tank if necessary. An overflow channel 21 is provided on the settling tank 17; this channel 21 leads to a slag granulation system 22 provided with a dewatering screw 23.

Now the operation of the above plant will be described.

The mixture of ore and fuel, which both are dried and ground, is thoroughly homogenized and is stored in a series of bins, not shown. This mixture is then drawn, at a constant rate, and is transformed into green pellets which are dried by the waste gases coming from the rotary kiln 11, into which they are then fed. There they are heated to a temperature between 1000 and 1200° C.

The rotary kiln 11 is mainly heated by utilizing the hot gases escaping from the smelting furnace 2 through the dust chamber 9 and the ducts 12. The rotary kiln 11 also is provided with fans, not shown, which enable the flowing into the kiln of adjustable quantities of air, thereby controlling the composition of the circulating gases and especially their slightly oxidizing character. The pellets emerging from the rotary kiln 11 have already acquired good strength; the total of the contained nickel is reduced to the metallic state; regarding the iron, only a small part, not exceeding 6%, is reduced to the metallic state, 70 to 85% being found as FeO and the remainder as $Fe_2O_3$; the pellets so produced contain a small quantity of carbon, not exceeding 1%. The bulk of the $Fe_2O_3$ is concentrated in the outer shells of the pellets, bringing about an increase of the softening point of the surface of said pellets; because of this increase a temperature up to 1200° C. may be used in the inlet end of the rotary kiln without any danger of producing coatings or rings.

The hot pellets emerging from the rotary kiln 11 are received and stored in an insulated bin 1; as shown by the arrows F, from the bin 1 the pellets are introduced continuously or intermittently through the water cooled chute 3 into the smelting furnace 2, where small quantities of fluxes, particularly calcium fluoride, and unground carbonaceous fuel, for instance pieces of coke, are usually added, for adjusting the melting point of the mixture to about 1300° C. and controlling the nickel content of the alloy to be produced. In fact, this content also depends on the amount of nickel, carbon and higher iron oxides contained in the charge of the smelting furnace.

The charge of the smelting furnace 2 is heated directly by the flames of the burners 5 and 6 and by the radiation from the walls. At about 1350° C. the smelting of the non-metallic part of the said charge is generally complete, while the metal is still in a pasty state. Heating at 1450 to 1550° C. is generally necessary for giving to the metal and the slag the desired fluidity. The rotation of the smelting furnace 2 produces a continuous renewal of the metal-slag interface and activates the chemical reactions in this zone. Especially, the reactions of the refining by the FeO-rich slag become very active and chemical equilibrium between the alloy and the slag is rapidly attained. The easily oxidazable elements such as the silicon, the chromium, the phosphorus and the carbon are eliminated from the alloy, in which remains as an impurity only the sulphur; the percentage of this element depends on its content in the initial ore, in the carbonaceous fuel used and in the oil employed in the burners 5 and 6; the elimination of the sulphur from the alloy can be carried out by well known processes.

The very intense cooling of the furnace shell by the spraying system 7 secures the protection of the lining bricks 4 by enabling the establishment of a self-lining action in the zone of liquid slag. The condition of the lining is continuously followed through the indications of the thermocouple-elements 15. The combustion gases escape at the feeding inlet 8 and are directed, as shown by the arrows L, towards the rotary kiln 11, through the dust chamber 9. The free surface of the metallic bath in the smelting furnace is approximately established at the lower level attained by the hole 16 during the rotation of the furnace 2.

At the end 24 of the smelting furnace 2, opposite to the feeding inlet 8, the melts of alloy and slag are evacuated either through the hole 16 or through the mouth of the furnace, into the settling tank 17, as shown by the arrow G. The alloy is concentrated in the cylindrical part 18, where its temperature is maintained at the desired level, thanks to the induction heating provided, and it is tapped through the channel 27, as indicated by the arrow H. The slag gathering in the upper part 19 is directed through the channel 21, as shown by the arrow K, to the tank 22, in which it is granulated; from the granulation tank 22 the slag is evacuated by the dewatering screw 23.

The present process combines in an original way the homogenization and the agglomeration of the ore and the reducing agent in the form of green pellets, the preliminary treatment of these pellets in a rotary reduction kiln 11, then their smelting in a rotary furnace 2 with eventual addition of fluxes and carbon. It enables, in a particularly economical way, the extraction of the nickel from the laterites, obtaining it directly in the form of ferro-nickel free from oxidizable impurities. The nickel content of this alloy can be readily adjusted to any level up to 90%; however, in order to keep the losses of nickel low, it should generally not exceed 27 to 30%, which is the minimum commercially acceptable. In fact, the highest possible recovery is obtained when the operation is carried out close to the equilibrium conditions, and it is well known that under such conditions, the nickel content in the slag is in a linear relation with the nickel content in the alloy, increasing with it. With a nickel content of 27 to 30% in the alloy, a slag containing less than 0.07% nickel is currently obtained; for a usual laterite containing 1.2 to 1.5% nickel, the total recovery of nickel is at least 95%. Owing to this high recovery and to the very economical means used in the described process, it is possible to treat profitably very poor ores which cannot be treated by any other process.

For a better understanding of the advantages of the invention two illustrative examples are given below, without setting any limitations for the application of the process.

EXAMPLE I

A lateritic ore from the Philippines containing: 1.44% nickel; 0.08% cobalt; 30.50% iron; 21.80% silica; 10.30% magnesia; 9.2% $Al_2O_3+TiO_2$ and 27% water, is dried and ground, then mixed with 12% (on dry weights) lignite containing 31.10% fixed carbon; 54.90% volatile materials and 14.00% ash; this lignite has a total sulphur content of 2.44%, part of which is included in the volatile materials and part in the ash.

After thorough homogenization the fine mixture is nodulized and transformed into green pellets, and then treated in a rotary kiln at 1050° C. in a slightly oxidizing atmosphere. The reduced hot pellets emerging from the rotary kiln are sufficiently resistant and contain 0.96% C, with all of their nickel and cobalt in the metallic state, and part of the iron as FeO (38.2% of FeO on the weight of the pellets); no metallic iron is present.

The pellets so reduced are then mixed with 1% of calcium fluoride and 1.1% of carbon in the form of pieces of coke, and smelted in a rotary furnace at 1450° C. The ferro-nickel obtained contains: 29.10% nickel; 1.13% cobalt; 0.03% silicon; 0.01% phosphorus; 0.02% chromium; and 0.11% sulphur. 95.67% of the nickel contained in the ore is recovered in the ferro-nickel; the slag contains about 0.05% nickel.

EXAMPLE II

The same reduced pellets as in Example I are mixed with 1% of calcium fluoride and 0.08% of carbon, added as coke, then smelted in a rotary furnace at 1480° C. The ferro-nickel obtained contains 41.65% nickel and the slag contains 0.13% nickel; the total recovery of nickel is decreased to 90.90%.

It is to be understood that numerous modifications and variations may be resorted to without departing from the spirit and scope of the invention, as those skilled in the art will readily understand. Thus, the reduction of the green pellets may be accomplished by any one of the well known techniques, namely on a Dwight-Lloyd grate, in a shaft furnace or in a rotary kiln as described above.

I claim:

1. A process of producing ferro-nickel of high nickel content from iron ore of low nickel content, comprising the steps of:
   (a) mixing and grinding solid carbonaceous fuel with the ore, and nodulizing to form homogeneous pellets,
   (b) heating the pellets to a temperture of 1000 to 1200° C. in a slightly oxidizing atmosphere to form an outer shell of $Fe_2O_3$ on each pellet, the proportion of carbonaceous fuel initially mixed with the ore being such that in the resulting heat-treated pellets the nickel is in the metallic state, not more than 6% of the iron is in the metallic state, 70 to 85% of the iron is present as FeO, and the remainder as $Fe_2O_3$ concentrated in the outer shells, and the carbon content is not more than 1%,
   (c) charging the pellets into a rotary furnace and there heating to a temperature of 1450 to 1550° C. by the flame of at least one burner, and separating the resulting molten alloy and slag.

2. A process according to claim 1 wherein a solid unground carbonaceous fuel is mixed with the pellets charged into the rotary furnace.

3. A process according to claim 2 wherein a flux is also mixed with the pellets.

4. A process according to claim 3 wherein the flux comprises calcium fluoride.

5. A process, according to claim 1, wherein the molten alloy and the slag from the smelting operation are drained into a settling tank in which they separate into two layers, a predetermined temperature being maintained in the lower part of the tank.

6. A process according to claim 1 wherein the rotary furnace is slightly inclined and lined with magnesia bricks, and is externally cooled.

7. A process according to claim 6 wherein the exterior of the rotary furnace is covered with a film of cooling water.

8. A process according to claim 1 wherein a settling tank for separating the slag from the molten alloy is provided under the exit end of the furnace.

9. A process according to claim 8 wherein the temperature of the molten alloy in the lower part of the settling tank is controlled by induction heating.

10. A process according to claim 8 wherein the upper part of the settling tank is cooled by water circulation.

11. A process according to claim 8 wherein the settling tank is interchangeable.

12. A process according to claim 1 wherein the rotary furnace is heated by a long flame burner and a short flame burner extending into the exit end of the furnace.

References Cited

UNITED STATES PATENTS

| | | | |
|---|---|---|---|
| 1,717,160 | 6/1929 | Kichline | 75—31 X |
| 2,900,248 | 8/1959 | Johannsen | 75—82 X |
| 3,503,734 | 3/1970 | Bell | 75—82 UX |
| 3,503,376 | 3/1970 | Sherwood | 75—39 |
| 3,511,644 | 5/1970 | Josefsson et al. | 75—38 |
| 3,634,064 | 1/1972 | Vedensky et al. | 75—82 X |

L. DEWAYNE RUTLEDGE, Primary Examiner

M. J. ANDREWS, Assistant Examiner

U.S. Cl. X.R.

75—31, 40, 82